United States Patent
Magnes et al.

(10) Patent No.: US 9,722,272 B2
(45) Date of Patent: *Aug. 1, 2017

(54) ADDITIVES FOR ZINC-BROMINE MEMBRANELESS FLOW CELLS

(71) Applicant: BROMINE COMPOUNDS LTD., Beer Sheva (IL)

(72) Inventors: Ben-Zion Magnes, Meitar (IL); Iris Ben David, Ashdod (IL); Eli Lancry, Ashdod (IL); Mira Bergstein-Freiberg, Omer (IL)

(73) Assignee: BROMINE COMPOUNDS LTD., Be'er-Sheva (IL)

( * ) Notice: Subject to any disclaimer, the term of this patent is extended or adjusted under 35 U.S.C. 154(b) by 172 days.

This patent is subject to a terminal disclaimer.

(21) Appl. No.: 14/399,106

(22) PCT Filed: May 9, 2013

(86) PCT No.: PCT/IL2013/000049
§ 371 (c)(1),
(2) Date: Nov. 5, 2014

(87) PCT Pub. No.: WO2013/168145
PCT Pub. Date: Nov. 14, 2013

(65) Prior Publication Data
US 2015/0155584 A1   Jun. 4, 2015

Related U.S. Application Data

(60) Provisional application No. 61/645,289, filed on May 10, 2012, provisional application No. 61/658,925, filed on Jun. 13, 2012.

(51) Int. Cl.
*H01M 8/18* (2006.01)
*H01M 8/20* (2006.01)
(Continued)

(52) U.S. Cl.
CPC ............ *H01M 8/188* (2013.01); *H01M 8/20* (2013.01); *H01M 12/085* (2013.01); *H01M 2/40* (2013.01);
(Continued)

(58) Field of Classification Search
CPC ..... H01M 8/188; H01M 8/20; H01M 8/04186
(Continued)

(56) References Cited

U.S. PATENT DOCUMENTS

| 4,064,324 A | 12/1977 | Eustace |
| 4,065,601 A | 12/1977 | Ajami et al. |

(Continued)

FOREIGN PATENT DOCUMENTS

| CN | 101003510 | 7/2007 |
| CN | 101492423 | 7/2009 |

(Continued)

OTHER PUBLICATIONS

International Search Report for PCT/IL2013/000049 mailed Aug. 29, 2013.
(Continued)

*Primary Examiner* — Stewart Fraser
*Assistant Examiner* — Rachel L Zhang
(74) *Attorney, Agent, or Firm* — Nixon & Vanderhye P.C.

(57) ABSTRACT

The invention relates to the use of nitrogen-containing compounds belonging to the classes of N-alkyl pyridinium halide, N-alkyl-2-alkyl pyridinium halide and 1-alkyl-3-alkyl imidazolium halide, as additives in electrolyte solutions for zinc bromine membraneless flow cells. The invention also provides electrolyte solutions comprising such additives and processes for operating said cells.

10 Claims, 3 Drawing Sheets

Figure 1:
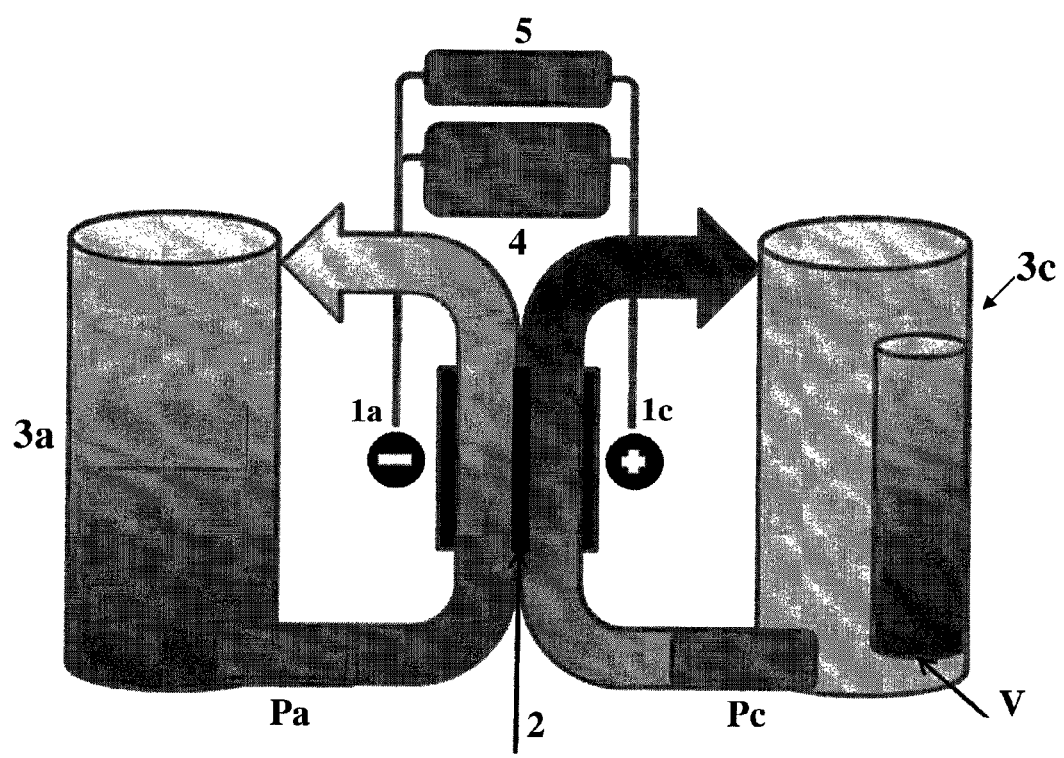

(51) Int. Cl.
*H01M 12/08* (2006.01)
*H01M 8/04186* (2016.01)
*H01M 2/40* (2006.01)
*H01M 10/36* (2010.01)

(52) U.S. Cl.
CPC ...... *H01M 8/04186* (2013.01); *H01M 10/365* (2013.01); *H01M 2300/0002* (2013.01); *Y02E 60/128* (2013.01)

(58) Field of Classification Search
USPC .......................................................... 429/51
See application file for complete search history.

(56) References Cited

U.S. PATENT DOCUMENTS

| | | | |
|---|---|---|---|
| 4,510,218 | A | 4/1985 | Ando et al. |
| 4,520,081 | A | 5/1985 | Höhne et al. |
| 4,631,240 | A | 12/1986 | Walsh |
| 4,906,342 | A | 3/1990 | Takahashi et al. |
| 5,260,148 | A | 11/1993 | Idota |
| 5,591,538 | A | 1/1997 | Eidler et al. |
| 5,601,943 | A | 2/1997 | Eidler et al. |
| 6,025,457 | A | 2/2000 | Ohno et al. |
| 2001/0028977 | A1 | 10/2001 | Kazacos et al. |
| 2003/0165737 | A1* | 9/2003 | Nakagawa ............ H01M 4/485 429/188 |
| 2011/0233532 | A1 | 9/2011 | Sotzing et al. |
| 2011/0253553 | A1 | 10/2011 | Bergstein Freiberg et al. |
| 2014/0262818 | A1 | 9/2014 | Ben-David et al. |
| 2014/0302408 | A1* | 10/2014 | Magnes ................ H01M 8/188 429/409 |

FOREIGN PATENT DOCUMENTS

| | | |
|---|---|---|
| CN | 102049202 | 5/2011 |
| EP | 0 404 188 | 12/1990 |
| JP | 11-509035 | 8/1999 |
| WO | WO 2013/042103 | 3/2013 |
| WO | WO 2013/042109 | 3/2013 |
| WO | WO 2013/042110 | 3/2013 |
| WO | WO 2013/168145 | 11/2013 |

OTHER PUBLICATIONS

Written Opinion of the International Searching Authority for PCT/IL2013/000049 mailed Aug. 29, 2013.
U.S. Appl. No. 14/210,976, filed Mar. 14, 2014, Magnes et al.
U.S. Appl. No. 14/220,631, filed Mar. 20, 2014, Ben-David et al.
Chinese Office Action issued in App. No. 201380023555.1 dated Mar. 3, 2016 (w/ partial translation.).
Australian Intellectual Property Office, "Patent Examination Report No. 1," issued in connection with Australian Patent Application No. 2014201398, dated Jan. 22, 2016.
Barlet et al; Syntheses et Proprietes D'Halogenures D'Ammonium Quaternaire Utilisables Comme Electrolytes, Journal de Chimie Physique et de Physio-Chimie Biologique, 1984, 81 (5), p. 349-354.
Butler et al., "Zinc/Bromine Batteries," *Advanced Battery Systems*, Chapter 37, pp. 37.1-37.3 (2000).
Cathro et al., "Selection of Quaternary Ammonium Bromides for Use in Zinc/Bromine Cells," *Journal of Power Sources*, vol. 18, pp. 349-370 (1986).
Chinese Office Action issued in App. No. 201280057395.8, dated Sep. 7, 2015 (with English translation).
Couling et al., "Assessing the factors responsible for ionic liquid toxicity to aquatic organisms via quantitative structure-property relationship modeling," *Green Chemistry*, 2006, vol. 8, pp. 82-90.
Docherty et al., "Biodegradability of imidazolium and pyridinium ionic liquids by an activated sludge microbial community," *Biodegradation*, 2007, vol. 18, pp. 481-493.
Extended European Search Report issued in App. No. 12833458.8 dated Mar. 30, 2015.
Hashimoto et al., J. Amer. Cham, Soc, vol. 107, 1985, pp. 4655-4662.
International Search Report for PCT/IL2012/000349, mailed Dec. 18, 2012.
International Search Report for PCT/IL2014/000010, mailed Jun. 4, 2014.
Lukes et al., "Reduction of the Pyridine Nucleus with Formic Acod. III. Reduction of 3-Picoline", Chemicke Listy Pro Vedu a Prumysl, vol. 44, Dec. 31, 1950, pp. 297-300.
Murrill, Halides and Perhalides of the Picolines, Journal of the American Chemical Society, 21, Jun. 19, 1899, p. 828-854.
Nishida et al., "Physical and electrochemical properties of 1-alkyl-3-methylimidazolium tetrafluoroborate for electrolyte," *Journal of Fluorine Chemistry*, 2003, vol. 120, pp. 135-141, Elsevier Science B.V.
Ploquin et al., β-Dicéto énamines hétérocycliques: 2.(Pyridyl-4)-2 indanediones-1,3 C-et N-substituées, Journal of Heterocyclic Chemistry, 17, Jul. 1980; p. 997-1008.
Shao et al., [Pige Huagong], 23, 2006, pp. 23-26.
Shlyapnikov, D.S.—Abstract—Khimiya Geterotsiklicheskikh Soedinenii, 1972, (7), p. 966-969.
Shlyapnikov, D.S. Khimiya Geterotsiklicheskikh Soedinenii, 1972, (7), p. 966-969.
Waterkamp et al., Chem. Eng. & Tech 32 (11), 2009, pp. 1717-1723.
Written Opinion of the ISA for PCT/IL2012/000349, mailed Dec. 18, 2012.
Written Opinion of the ISA for PCT/IL2014/000010, mailed Jun. 4, 2014, 5 pages.

* cited by examiner

ADDITIVES FOR ZINC-BROMINE MEMBRANELESS FLOW CELLS

This application is the U.S. national phase of International Application No. PCT/IL2013/000049 filed 9 May 2013 which designated the U.S. and claims the benefit of U.S. Provisional Application No. 61/645,289 filed 10 May 2012, and U.S. Provisional Application No. 61/658,925 filed 13 Jun. 2012, the entire contents of each of which are hereby incorporated by reference.

The invention relates to compounds suitable as additives for an electrolyte used in zinc-bromine membraneless flow cells, for complexing the elemental bromine formed in such cells.

There exists a need, in electrochemical flow cells which involve the generation and utilization of elemental bromine, to keep the bromine in a form which can be readily stored and pumped over a broad temperature range, such that it can be used without interfering with the operation of the flow cell, minimizing safety issues.

In its most common configuration, zinc-bromine rechargeable cell contains two chemically non-reactive electrodes and a suitable separator located between the electrodes (e.g. an ion exchange membrane or microporous plastic sheet). The electrolyte used in the cell is an aqueous solution of zinc bromide, which is generally fed to the two compartments of the cell from two separate external reservoirs, utilizing a suitable circulation system. The term "anode" is used herein to indicate the electrode where metal zinc is formed (during charge) and oxidized (during discharge). The term "cathode" is used herein to indicate the electrode where elemental bromine evolves (during charge) and reduced (during discharge). The charge and discharge states of zinc-bromine battery will now be described in more detail.

During charge, an electric current is supplied to the cell from an external source, causing the deposition of zinc metal onto the anode and the concurrent generation of elemental bromine at the cathode, as shown by the following reaction:

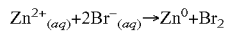

$$Zn^{2+}_{(aq)} + 2Br^-_{(aq)} \rightarrow Zn^0 + Br_2$$

The aqueous electrolyte solution which circulates through the cathodic side during the cell charge contains a complexing agent which is capable of readily forming a water-immiscible liquid phase upon complexing with elemental bromine. Thus, the elemental bromine generated at the cathodic side during cell charge reacts almost instantaneously with the water-soluble complexing agent, to form a water immiscible oily phase. The dense bromine-containing oily phase tends to settle at the bottom of the reservoir used for holding the catholyte. In this way, bromine is produced and stored in a reservoir outside the electrode.

During discharge, the reverse chemical reaction takes place and an electric current is drawn from the cell. The bromine-containing liquid, which forms part of the catholyte, is brought to the cathodic side of the cell, while the anolyte is simultaneously circulated through the anodic side. This results in the dissolution of the zinc anode to give zinc ions and the reduction of elemental bromine to form bromide ions (and the generation of electrical current). The chemical reaction is represented by the following equation:

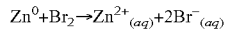

$$Zn^0 + Br_2 \rightarrow Zn^{2+}_{(aq)} + 2Br^-_{(aq)}$$

FIG. 1 provides a schematic illustration of an example of a traditional zinc-bromine cell, wherein numerals 1a and 1c indicate the anode and cathode, respectively, and numeral 2 represents the separator positioned between the electrodes. A reservoir for accommodating an aqueous solution of zinc bromide, used as the anolyte, is indicated by numeral 3a. Similarly, a reservoir 3c contains the catholyte, which may consist of two liquid phases: an upper, aqueous solution of zinc bromide and a lower, dense organic phase comprising the elemental bromine in a form of a complex. The flow paths allowing the circulation of the anolyte and catholyte are respectively indicated by arrows (the streams are driven by pumps Pa, Pc). A suitable valve (v) allows injection of bromine into the flow path of the catholyte on discharge only. A power source and a load are electrically connected to the electrodes (numerals 4 and 5, respectively).

Bromine is a dark red, fuming liquid. It is reactive and corrosive and has a high vapor pressure at room temperature. In cells utilizing bromine as an electrochemically active element, there is a need to deactivate the bromine, such that it is less likely to interfere with the operation of the cell, and to convert it into a form with reduced vapor pressure. It is known in the art that these goals can be achieved by adding a bromine-complexing agent to the electrolyte. The bromine-complexing agent combines with bromine molecule(s) to form a polybromide complex. Bromine-complexing agents are typically able to complex up to 4 bromine molecules per complex. As a result, the vapor pressure above the complexed bromine solution is decreased.

In flow cell batteries the electrolyte reservoir is separated from the electrodes stack, with the electrolyte being pumped from the reservoir to the electrodes and back. The flowability of the electrolyte must be maintained with respect to different compositions corresponding to different states of charge, and over the entire operational temperature range (typically between −15° C. and 50° C.). In other words, throughout the operation of the cell, the formation of a solid phase in the electrolyte is unacceptable. It should also be noted that in the case of the commonly used zinc-bromine flow cell, the anolyte and catholyte are stored in two separate tanks and are circulated through two circulation lines.

The use of a separator in a traditional zinc bromine flow cell utilizing different anolyte and catholyte solutions is for preventing the mixing of the solutions and the migration of elemental bromine molecules to the anolyte stream. It should be noted that bromine migration to the anodic side results in a lower columbic efficiency due to direct chemical reaction between the elemental bromine and the zinc anode ("self discharge"). The separator is usually a microporous plastic sheet or an ion exchange membrane (for example Nation©) that act as a physical barrier for different electrolyte solutions or specific species contained in those solutions or produced and consumed during the cell operation. Still, in order to maintain electrical conductivity and charge neutralization, the separator must allow the transport of required ions from one compartment to the other.

However, one serious disadvantage associated with the use of a separator in a zinc-bromine flow cell is that the cell internal resistance is inevitably increased. The later is a limiting factor in terms of the ability of the electrochemical system to deliver high currents with minimal voltage drop.

It may therefore be appreciated that the use of membraneless configuration can be highly beneficial. In its most general form, a membraneless electrochemical cell configuration comprises a pair of electrodes and is devoid of a physical barrier (i.e., a separator) in the reaction zone between the electrodes. By removing the separator, several advantages can be gained. First, the internal resistance which is developed due to the physical barrier for ions movement from one compartment to the other is eliminated. Second, in a membraneless electrochemical cell, one electrolyte storage tank and one pump for circulating said electrolyte are used, which is certainly cost effective in comparison with the operation of the common zinc-bromine flow cell illustrated in FIG. 1, where two electrolyte tanks and two pumps are necessary.

Bromine complexing agents were investigated for the deactivation of elemental bromine in traditional (i.e., membrane-containing) zinc bromine flow batteries. Bromine deactivation in these batteries may be achieved by the use of cyclic quaternary ammonium bromides as complexing agents. In their most general form, these salts are represented by the following formula:

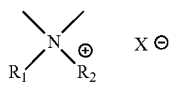

where $R_1$ and $R_2$ indicate the alkyl groups (which are generally different from one another) and X indicates the halide counter ion. It should be particularly noted that in the formula depicted above, the cation is a non-aromatic heterocyclic system. Specifically, N-methyl-N-ethyl pyrrolidinium bromide (abbreviated MEP) and N-methyl-N-ethyl morpholinium bromide (abbreviated MEM) were suggested in U.S. Pat. No. 4,510,218 and are both commercially used for that purpose.

Furthermore, U.S. Pat. No. 4,065,601 describes a two-phase electrolyte for use in trapping halogen in conventional zinc/bromine cells, wherein the organic phase of the electrolyte contains water-immiscible organic solvent in combination with a complexing agent which may be selected from the group consisting of quaternary ammonium salts and pyridinium salts. U.S. Pat. Nos. 4,064,324 and 4,631,240 describe the use of some pyridinium salts substituted with acid or ester of the following formula:

as additives for zinc bromide cell.

One important property of bromine-complexing agents is the partition of bromine between the aqueous electrolyte phase and the oily phase. The partition depends on the complexation ability of the bromine complexing agent used. The concentration of the 'free' bromine (the bromine dissolved directly in the aqueous zinc bromide phase) in traditional zinc bromine flow cell electrolyte solutions is around 1% (in the presence of MEP or MEM and when the cell is fully charged). This value seems to be a good compromise between the availability of 'free' bromine to the electrochemical reaction and the need to minimize the levels of both bromine vapor pressure in the cell and bromine crossover to the zinc compartment. In fact, the 'free' bromine is the main bromine source for the discharge reaction on the bromine electrode while the de-complexation of bromine from the oily phase occurs as a result of the depletion of bromine from the aqueous phase and not directly as a part of the electrochemical process.

In a membraneless configuration, the need to minimize sources for self-discharge reactions is stricter due to the presence of bromine in the electrolyte and the direct contact of the electrolyte solutions and the zinc electrode. Therefore, it is desirable to minimize the amount of bromine dissolved in the aqueous zinc bromide solution by complexing more and more bromine in the oily phase.

The experimental work made in connection with this invention indicates that neither N-methyl-N-ethyl pyrrolidinium bromide nor N-methyl-N-ethyl morpholinium bromide is suitable for use in zinc bromine membraneless flow cells, for the reason that they leave relatively high amount of 'free' bromine in the electrolyte solution used in such cells.

It has been found that compounds belonging to the following classes:
(i) N-alkyl pyridinium bromide [such as N-ethyl pyridinium bromide (abbreviated herein EPy)];
(ii) N-alkyl-2-alkyl pyridinium bromide [such as N-ethyl-2-methylpyridinium bromide (abbreviated herein 2-MEPy)]; and
(iii) 1,3 dialkyl imidazolium bromide [such as 1-butyl 3-methyl imidazolium bromide (abbreviated herein BMIBr)];
and mixtures of said (i)-(iii) compounds, can be used as complexing agents in aqueous electrolytes operable in a zinc bromine membraneless flow cell. It has been found that the presence of said compounds in the electrolyte allows the formation of acceptable levels of 'free' bromine in the aqueous phase under the relevant working conditions. The complex formed by the use of said additives does not solidify even at a temperature of $-5°$ C., thus maintaining the flowability of the electrolyte with respect to different compositions corresponding to different states of charge over a broad operational temperature range.

Accordingly, the invention provides an electrolyte suitable for use in a zinc bromine membraneless flow cell, said electrolyte comprising aqueous zinc bromide solution and a liquid complex composed of bromine-complexing agent combined with one or more bromine molecules, wherein the bromine-complexing agent is selected from the group consisting of:
(i) N-alkyl pyridinium halide,
(ii) N-alkyl-2-alkyl pyridinium halide,
(iii) 1-alkyl-3-alkyl imidazolium halide,
and mixtures thereof.

In another aspect, the invention is directed to a process for operating a zinc bromine membraneless flow cell, comprising adding to the electrolyte of said cell at least one bromine-complexing agent selected from the group consisting of:
(i) N-alkyl pyridinium halide,
(ii) N-alkyl-2-alkyl pyridinium halide, and
(iii) 1-alkyl-3-alkyl imidazolium halide,
charging and/or discharging said cell.

The invention also relates to the use of at least one of:
(i) N-alkyl pyridinium halide,
(ii) N-alkyl-2-alkyl pyridinium halide, and
(iii) 1-alkyl-3-alkyl imidazolium halide
as bromine-complexing agents in zinc bromine membraneless electrochemical flow cell.

It should be noted that the foregoing compounds of classes (ii) and (iii) contain two alkyl groups attached to the ring system; these two alkyl group(s) may be the same or different and are independently selected from preferably C1-C10 alkyl groups, e.g., C1-C7 alkyl groups, and more specifically, C1-C4 alkyl groups. Preferred are "mixed" compounds, where the alkyl groups attached to the ring are different. The halide is preferably bromide.

Regarding the class of N-alkyl pyridinium bromide compounds, one preferred complexing agent according to the invention is N-ethyl pyridinium bromide:

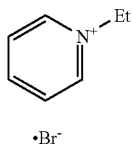

N-ethyl pyridinium bromide can be readily prepared by methods known in the art. For example, N-(ethyl)pyridinium bromide can be synthesized by a reaction of pyridine with bromoethane, as described by Shao et al. [Pige Huagong, 23(1), p. 23-26 (2006)] and by Hashimoto et al. [J. Amer. Chem. Soc., 107(16), (1985), p. 4655-4662 (1985)]. A full preparation procedure is set forth below.

Regarding the class of N-alkyl-2-alkyl pyridinium halide compounds, a complexing agent suitable for use according to the invention is N-alkyl-2-methylpyridinium bromide, especially N-ethyl-2-methylpyridinium bromide, which is prepared by reacting 2-picoline with ethyl bromide, as illustrated by the following reaction schemes:

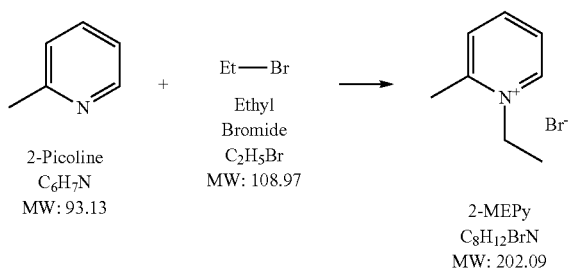

The reaction is carried out by charging a pressure reactor with the reactants and optionally also with a solvent, which may be either an aqueous or organic solvent. Alternatively, ethyl bromide can be used in excess. It is possible to introduce the entire amounts of the reactants into the reactor and then start the reaction by heating the reaction mixture. However, it is also possible to gradually feed one or more of the reactants (e.g., the ethyl bromide) into the reactor over a period of not less than one hour under heating.

The reaction mixture is heated, preferably to a temperature of not less than 90° C., and the reaction is allowed to proceed under pressure for a few hours. For example, the pressure reactor, which contains 2-picoline, is heated, preferably to a temperature above 70° C., e.g., from 80 to 110° C., following which the gradual addition of the ethyl bromide is started and allowed to continue, preferably in a continuous manner, for not less than 60 minutes. Upon completion of the addition of ethyl bromide, the reaction is maintained under heating at a temperature above 95° C., e.g., from 95 to 110° C., for not less that 30 minutes whereby the reaction is completed. The product is conveniently collected in the form of an aqueous solution, which can be directly applied as an additive for the electrolyte solution in accordance with the present invention. To this end, upon completion of the reaction, the organic solvent and/or residual amounts of the starting materials are removed from the reaction vessel by means of methods known in the art, e.g., distillation. Water can then be added into the reactor, before the product has solidified, to afford the complexing agent in an aqueous form.

Regarding the class of 1-alkyl-3-alkyl imidazolium bromide compounds, preferred complexing agents suitable for use according to the invention are 1-alkyl-3-methyl imidazolium bromide, in particular 1-n-butyl-3-methyl imidazolium bromide:

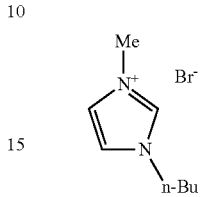

which can be readily synthesized by methods known in the art. In general, 1-alkyl 3-methyl imidazolium halide can be prepared by reacting 1-methylimidazole with alkyl halide. For example, the synthesis of 1-alkyl 3-methyl imidazolium bromide is described in CN 101492423, CN 101003510 and by Waterkamp et al. [Chemical Engineering & Technology 32(11), p. 1717-1723 (2009)]. The compound is also commercially available.

As noted above, the bromine complexing agents, e.g., (i) N-ethyl pyridinium bromide, (ii) N-ethyl-2-methylpyridinium bromide, (iii) N-butyl-3-methyl imidazolium bromide or mixtures thereof, are added to an electrolyte solution operable in membraneless zinc/bromine cell. A suitable aqueous electrolyte solution which may be used in zinc bromine membraneless batteries has the following composition: $ZnBr_2$ at a concentration from 0.5M to 8.0 M, (preferably 0.5 to 5.0 M, e.g. 1.5 to 3.0 M); a complexing agent at a concentration of not less than 0.25M, e.g., from 0.25 M-3.0 M and optionally, one or more water soluble salts such as halide salts, e.g., zinc chloride, sodium chloride or potassium chloride, and also sulfate salts (all are conductivity enhancers up to 3.5 M). The total concentration of these secondary water-soluble salts, which may be optionally present in the electrolyte solution, can be up to 3.5 M, e.g., between 0.5-3.5 M. It is noted that the electrolyte further comprises the electrochemically generated bromine (which is formed in-situ in the cell on charging). On charging, the zinc bromide is consumed and bromine is generated. On discharging, the aqueous phase of the electrolyte is again concentrated with respect to $ZnBr_2$, and the concentration of elemental bromine is decreased.

As noted above, the bromine complexing agents of the invention may be used either in individual form or in the form of mixtures, e.g., binary mixtures, especially mixtures comprising 1-alkyl-3-alkyl imidazolium halide and at least one of N-alkyl pyridinium halide and N-alkyl-2-alkyl pyridinium halide. The use of a mixture of 1-alkyl-3-methyl imidazolium bromide and at least one of N-alkyl pyridinium bromide and N-alkyl-2-methyl pyridinium bromide is especially preferred, e.g., a mixture comprising 1-butyl-3-methyl imidazolium bromide together with either N-ethyl pyridinium bromide, N-ethyl-2-methylpyridinium bromide or both. When binary mixtures are used, then the molar ratio between the two components of the mixture is preferably from 1:5 to 5:1, e.g., 1:4 to 4:1, and more specifically, from 1:3 to 3:1. In some cases, mixtures in which the 1-alkyl-3-alkyl imidazolium halide is the major component and the substituted pyridinium bromide is the minor component are preferred, i.e., mixtures wherein the ratio is from 1:1 to 5:1 in favor of the 1-alkyl-3-alkyl imidazolium halide. Ratios are expressed as molar ratios.

An energy storage device in which the electrolyte of the invention may be used comprises one or more electrochemical cells and an electrolyte recirculation system, wherein the cell(s) contain spaced apart zinc and bromine electrodes, mounted in parallel with one another, wherein the space between the electrodes is devoid of membrane or separator. The energy storage device further comprises a recirculating electrolyte comprising zinc bromide, elemental bromine and one or more of (i) N-alkyl pyridinium halide, (ii) N-alkyl-2-alkyl pyridinium halide and (iii) 1-alkyl-3-alkyl imidazolium halide as described in detail above, along with other optional additives (e.g., zinc chloride, potassium chloride) as set out above.

The terms "zinc electrode" and "bromine electrodes" indicate that zinc and bromine are the electrochemically active elements reacting on said electrodes. The electrodes are typically made of conductive plastic or suitable metals (DSA®). The recirculation system includes one pump and one reservoir for storing the electrolyte. During charge, the electrodes are connected to the opposite poles of a power source, applying current density of at least 40 mA/cm². During operation of the energy storage device, the temperature is controlled in the range from 15 to 30° C.

IN THE DRAWINGS

FIG. 1 schematically illustrates the structure of a conventional zinc/bromine cell with a membrane positioned in the space between the electrodes.

Figure 2:
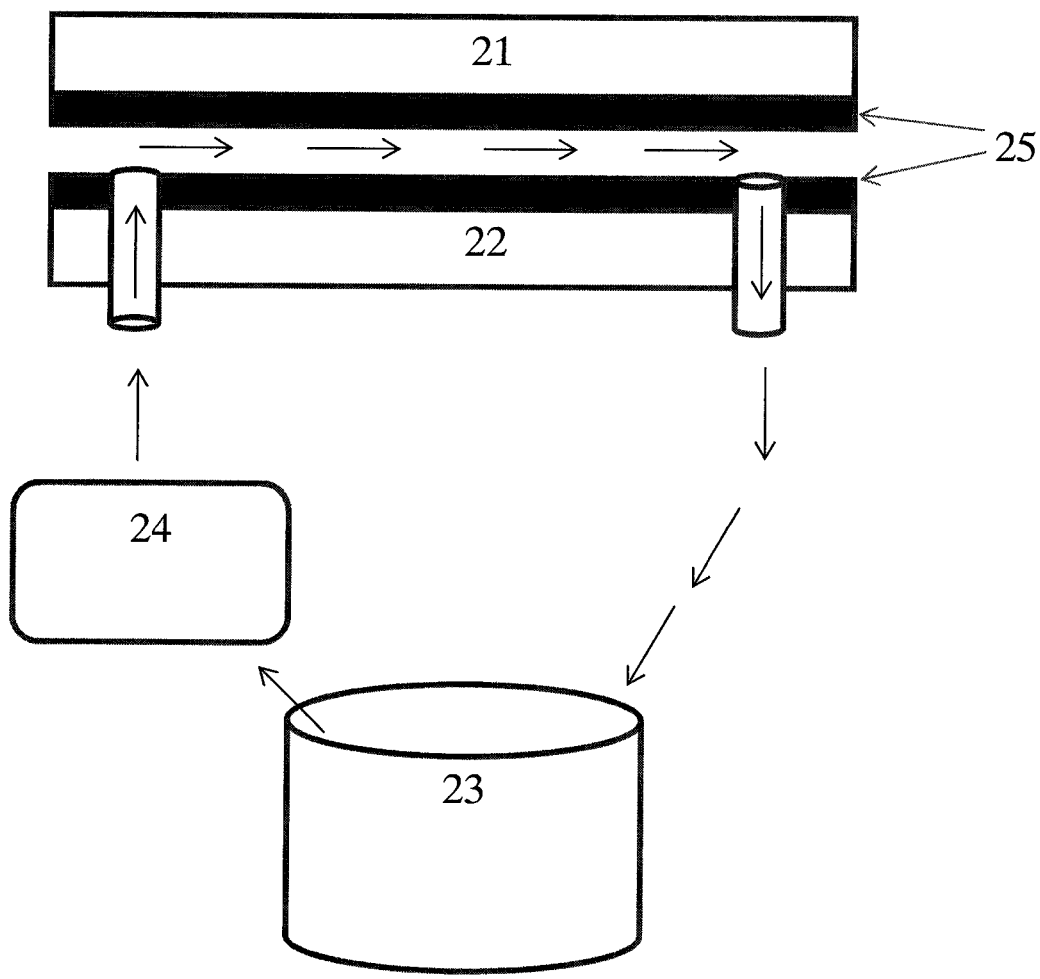

FIG. 2 schematically illustrates an experimental set-up representative of a membraneless cell configuration.

Figure 3:
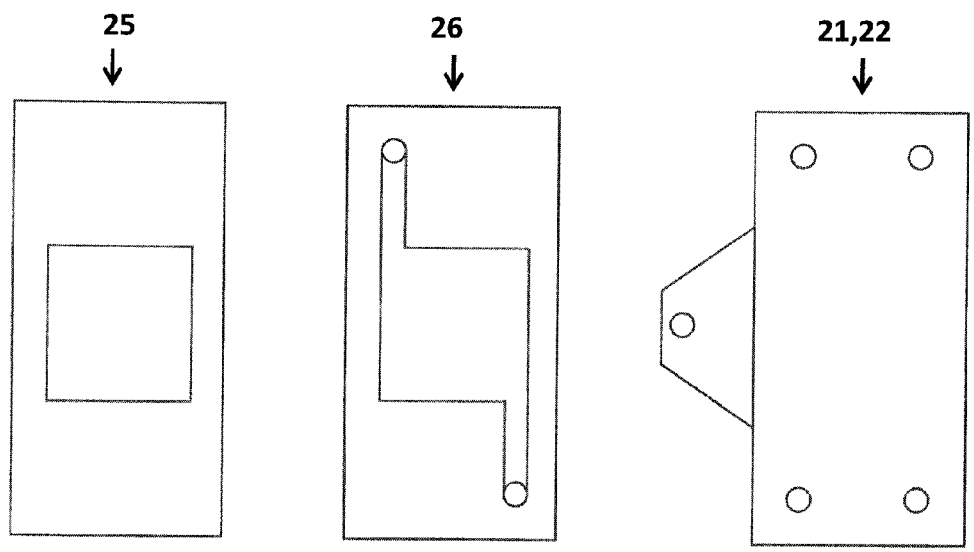

FIG. 3 provides a top view of some of the elements used in the experimental set-up of FIG. 2.

EXAMPLES

Methods
1) The specific conductivity of the zinc bromide solutions containing the complexing agents was measured at room temperature after the addition of bromine to the samples using InnoLab 740 instrument with graphite conductivity cell.
2) The temperature at which the formation of a solid phase takes place in the electrolyte solution was determined by gradually cooling the samples from room temperature (RT, approximately 25° C.) to −5° C. The cooling regime was as follows: the temperature was decreased from RT down to 15° C. with a cooling rate of 0.2° C./min, and kept at 15° C. for 4 hours and so forth down to −5° C. At each of the following temperatures: 15° C., 10° C., 5° C., 0° C. and −5° C., the solution was maintained at a constant temperature for four hours. The cooling test was performed in polyethylene glycol solution, until the formation of crystals was observed.
3) The bromine concentration in the aqueous phase above the polybromide complex-oily phase was determined by a conventional iodometric titration technique. Each vial was sampled two times at room temperature.
4) The vapor pressure above the electrolyte solutions containing the complexing agents was measured at 20-26° C. according to "Vapor pressures of bromine-quaternary ammonium salt complexes for zinc-bromine battery applications" Satya N. Bajpal *J. Chem. Eng. Data*, 26, 2-4 (1981).

In the examples that follow, bromine-complexing agent and mixtures thereof are sometimes abbreviated "BCA".

Preparations 1-3

Preparation of N-ethyl pyridinium bromide (EPy)

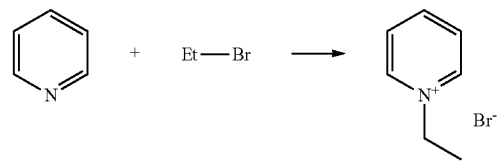

1) Preparation of EPy in Aqueous Medium:
A stirred pressure reactor was equipped with a thermocouple well and a dosing pump. The reactor was charged with pyridine (450 g) and de-ionized water (DIW) (330 mL), sealed and heated to 95° C. Ethyl bromide (600 g) was continuously added during 1 hour; afterwards heating was continued for additional 1 hour. The reactor was cooled to ambient temperature, the pressure was released and distillation apparatus installed. The reaction mass was diluted with DIW (200 mL) and distilled under vacuum until 200 mL of distillate were collected. Final product: 1340 g; 72% w (argentometric titration); yield, 93%.
2) Preparation of EPy in Aqueous Medium:
A stirred pressure reactor was equipped with a thermocouple well and a dosing pump. The reactor was charged with pyridine (475 g) and de-ionized water (DIW) (282 mL), sealed and heated to 95° C. Ethyl bromide (674 g) was continuously added during 1 hour; afterwards heating was continued for additional 1 hour. The reactor was cooled to ambient temperature, the pressure was released and distillation apparatus installed. The reaction mass was diluted with DIW (200 mL) and distilled under vacuum until 200 mL of distillate were collected. Final product: 1384 g; 77% w (argentometric titration); yield, 95%.
3) Preparation of EPy without a Solvent
A stirred pressure reactor was equipped with a thermocouple well and a dosing pump. The reactor was charged with pyridine (475 g), sealed and heated to 90° C. Ethyl bromide (667 g) was continuously added during 1 hour; afterwards heating was continued for additional 1 hour. The reactor was cooled to ambient temperature, the pressure was released and distillation apparatus installed. Initial distillation was applied under vacuum for 15 minutes. The reaction mass was diluted with DIW (300 mL) and further distilled under vacuum until 150 mL of distillate were collected. Final product: 1230 g; 88% w (argentometric titration); yield, 96%.

Preparations 4-6

Preparation of N-ethyl-2-methylpyridinium bromide (2-MEPy)

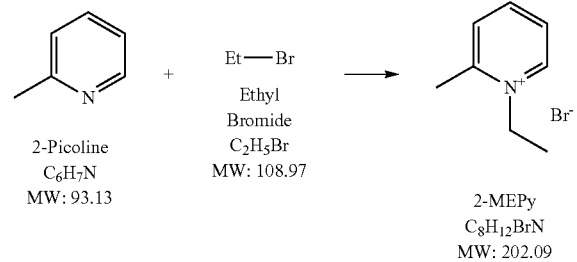

4) Preparation of 2-MEPy in Aqueous Medium

A pressure reactor was equipped with a mechanical stirrer with a magnetic relay and a thermocouple well. The reactor was charged with 2-picoline (101.3 g) and de-ionized water (DIW) (20 mL), sealed and the mixture was heated to 92° C. Ethyl bromide (97.9 g) was slowly added during 3 hours, at 92-100° C. The mixture was heated at 94-100° C. for additional 2 hours, then cooled, and the pressure was released. The crude solution was diluted with DIW (24 mL) and excess 2-picoline was distilled-off as aqueous azeotrope, under reduced pressure. Finally, the residue was diluted with DIW. Final product: 251 g; 66.1 weight % (argentometric titration); yield, 91.5%.

5) Preparation of 2-MEPy in Acetonitrile as a Solvent

A pressure reactor was equipped with a mechanical stirrer with a magnetic relay and a thermocouple well. The reactor was charged with 2-picoline (57.9 g), ethyl bromide (69 g) and acetonitrile (69 g). The reactor was sealed and the mixture heated to 97° C. Heating at 97° C. was continued for 6 hours. Distillation of the solvent was controlled by the upper valve of the reactor followed by vacuum distillation (without cooling). DIW (31 mL) was added to dissolve the crude mixture and vacuum was applied to remove residual acetonitrile. Finally, the solution was diluted with DIW (10.5 g). Final product: 149 g; 80.0 weight % (argentometric titration); yield, 95%.

6) Preparation of 2-MEPy with Excess of Ethyl Bromide

A pressure reactor was equipped with a mechanical stirrer with a magnetic relay and a thermocouple well. The reactor was charged with 2-picoline (95 g) and ethyl bromide (145 g). The reactor was sealed and the mixture heated to 97° C. Heating at 97° C. was continued for 18 hours. Distillation of excess ethyl bromide was controlled by the upper valve of the reactor followed by vacuum distillation (without cooling). Finally, the solution was diluted with DIW (47 g). Final product: 250 g; 79.3 weight % (argentometric titration); yield, 96%.

Examples 1-5

Preparing and Measuring the Properties of Zinc Bromide Electrolyte Solutions which Contain 1-butyl 3-methyl Imidazolium Bromide (BMIBr) as a Bromine-Complexing Agent To demonstrate the effect of 1-butyl 3-methyl imidazolium bromide, 24 ml samples were prepared, with electrolyte compositions corresponding to three distinct states of charge (SOC) defined by the concentrations of zinc bromide and elemental bromine. In addition to the aqueous solution of zinc bromide and elemental bromine (which were present in the samples in suitable amounts as set out in Table 1 below in order to match the state of charge investigated), each sample also contained zinc chloride and potassium chloride at constant concentrations of 0.5M and 1.0M, respectively. The samples were stored at 25° C. for 24-48 hours after preparation before any measurement was conducted. The samples were tested for one or more of the following properties: the temperature at which a solid phase is formed in the electrolyte, free bromine concentration in the aqueous phase, conductivity and vapor pressure. The results are tabulated in Table 1. The letters A, B and C next to the Example's number indicate the SOC that was investigated ((at the beginning, middle and end of charge process (0%, 50 and 100%, respectively)).

TABLE 1

| Example | % SOC | $ZnBr_2$ (M) | $Br_2$, M | BMIBr (M) | % $Br_2$, aq. | Vapor Pressure, mm Hg | Conductivity, mS/cm |
|---|---|---|---|---|---|---|---|
| 1A | 0 | 2.25 | 0.2 | 0.8M | 0.04 | | 135 |
| 1B | 50 | 1.125 | 1 | | 0.13 | | 140 |
| 1C | 100 | 0.25 | 2 | | 0.13 | <25 | 138 |
| 2A | 0 | 2.25 | 0.2 | 0.7M | 0.04 | | 130 |
| 2B | 50 | 1.125 | 1 | | 0.1 | | 142 |
| 2C | 100 | 0.25 | 2 | | 0.18 | <25 | 128 |
| 3A | 0 | 2.25 | 0.2 | 0.6M | 0.05 | | 136 |
| 3B | 50 | 1.125 | 1 | | 0.14 | | 143 |
| 3C | 100 | 0.25 | 2 | | 1.05 | | 121 |
| 4A | 0 | 2.25 | 0.2 | 0.5M | 0.06 | | 133 |
| 4B | 50 | 1.125 | 1 | | 0.28 | | 140 |
| 4C | 100 | 0.25 | 2 | | 0.96 | <25 | 133 |
| 5A | 0 | 2.25 | 0.2 | 0.4M | 0.07 | | 136 |
| 5B | 50 | 1.125 | 1 | | 0.47 | | 140 |
| 5C | 100 | 0.25 | 2 | | 1.80 | N/A | 123 |

Table 1 illustrates that the bromine vapor pressure measured is low, the amount of bromine measured in the aqueous phase is low and the electrolyte solution exhibits good conductivity.

Examples 6-8

Preparing and Measuring the Properties of Zinc Bromide Electrolyte Solutions which Contain N-ethyl Pyridinium Bromide (EPy) as Bromine-Complexing Agent To demonstrate the effect of N-ethyl pyridinium bromide, 24 ml samples were prepared, with electrolyte compositions corresponding to three distinct states of charge (SOC) defined by the concentrations of zinc bromide and elemental bromine. In addition to zinc bromide and elemental bromine (which were present in the samples in suitable amounts as set out in Table 2 below in order to match the state of charge investigated), each sample also contained zinc chloride and potassium chloride at constant concentrations of 0.5M and 1.0M, respectively. The samples were stored at 25° C. for 24-48 hours after preparation before any measurement was conducted. The samples were tested and the results are summarized in Table 2:

TABLE 2

| Example | % SOC | ZnBr$_2$ (M) | Br$_2$ (M) | EPy (M) | Br2, aq., % | Physical state of polybromide complex | Conductivity, mS/cm |
|---|---|---|---|---|---|---|---|
| 6A | 0 | 2.25 | 0.2 | 0.8M | 0.38 | Solid at −5° C.* | 116 |
| 6B | 50 | 1.125 | 1.0 | | 0.60 | Liquid at −5° C. | – |
| 6C | 100 | 0.25 | 2.0 | | 0.45 | Liquid at −5° C. | 140 |
| 7A | 0 | 2.25 | 0.2 | 0.7M | 0.32 | Liquid at −5° C. | 121 |
| 7B | 50 | 1.125 | 1.0 | | 0.53 | Liquid at −5° C. | – |
| 7C | 100 | 0.25 | 2.0 | | 0.45 | Liquid at −5° C. | 140 |
| 8A | 0 | 2.25 | 0.2 | 0.6M | 0.40 | Liquid at −5° C. | 120 |
| 8B | 50 | 1.125 | 1.0 | | 0.40 | Liquid at −5° C. | – |
| 8C | 100 | 0.25 | 2.0 | | 0.62 | Liquid at −5° C. | 132 |

*liquid at −1° C.

Table 2 illustrates that in general, the bromine-containing complex did not undergo solidification even at a temperature as low as −5° C., the amount of bromine measured in the aqueous phase is low and the electrolyte solution exhibits good conductivity.

Examples 9-10

Preparing and Measuring the Properties of Zinc Bromide Electrolyte Solutions which Contain Mixtures of EPy and BMIBr as Bromine-Complexing Agents To demonstrate the effect of mixtures of N-ethyl pyridinium bromide and 1-butyl 3-methyl imidazolium bromide (at molar ratios of 3:1 and 1:3), 24 ml samples were prepared, with electrolyte compositions corresponding to three distinct states of charge (SOC) defined by the concentrations of zinc bromide and elemental bromine. In addition to zinc bromide and elemental bromine (which were present in the samples in suitable amounts as set out in Table 3 below in order to match the state of charge investigated), each sample also contained zinc chloride and potassium chloride at constant concentrations of 0.5M and 1.0M, respectively. The samples were stored at 25° C. for 24-48 hours after preparation before any measurement was conducted. The samples were tested for one or more of the following properties: the temperature at which a solid phase is formed in the electrolyte, free bromine concentration in the aqueous phase, conductivity and vapor pressure. The results are set out in Table 3.

TABLE 3

| Example | % SOC | ZnBr$_2$ (M) | Br$_2$, M | BCA mixture | [BCA] M | Physical state of polybromide complex | % Br$_2$, aq. | Conductivity, mS/cm |
|---|---|---|---|---|---|---|---|---|
| 9A | 0 | 2.25 | 0.2 | EPy:BMIBr 1:3 | 0.8M | Liquid at −5° C. | 0.07 | 133 |
| 9B | 50 | 1.125 | 1.0 | | | Liquid at −5° C. | 0.1 | 151 |
| 9C | 100 | 0.25 | 2.0 | | | Liquid at −5° C. | 0.15 | 149 |
| 10A | 0 | 2.25 | 0.2 | EPy:BMIBr 3:1 | 0.8M | Liquid at −5° C. | 0.24 | 127 |
| 10B | 50 | 1.125 | 1.0 | | | Liquid at −5° C. | 0.25 | 151 |
| 10C | 100 | 0.25 | 2.0 | | | Liquid at −5° C. | 0.30 | 150 |

Table 3 illustrates that the mixed bromine-containing complex is highly effective, as it did not undergo solidification even at a temperature as low as −5° C., the amount of bromine measured in the aqueous phase is low and the electrolyte solution exhibits very good conductivity.

Example 11 (Comparative)

The procedures set forth in previous examples were repeated, but this time the complexing agent used was N-methyl-N-ethyl pyrrolidinium bromide (MEP). The results are given in Table 4.

TABLE 4

| Example | % SOC | $ZnBr_2$ | $Br_2$ (M) | MEP (M) | Physical state of polybromide complex | $Br_2$, aq., % | Conductivity, mS/cm |
|---|---|---|---|---|---|---|---|
| 11A | 0 | 2.25 | 0.2 | 0.8M | Liquid at 0° C. | 0.44 | 88 |
| 11B | 50 | 1.125 | 1.0 | | Solid at 0° C. | 0.60 | 95 |
| 11C | 100 | 0.25 | 2.0 | | Solid at 5° C. | 0.98 | 90 |

Table 4 illustrates that the bromine-containing complex solidifies already at 5° C. and the conductivity of the electrolyte solution is relatively low, clearly indicating the inferiority of MEP in comparison to the additives of the invention. The amount of 'free' bromine in the aqueous phase is relatively high.

Examples 12-14

Preparing and Measuring the Properties of Zinc Bromide Electrolyte Solutions which Contain Mixtures of 2-MEPy and BMIBr as Bromine-Complexing Agents To demonstrate the effect of mixtures of N-ethyl-2-methyl pyridinium bromide and 1-butyl 3-methyl imidazolium bromide (at molar ratios of 3:1, 1:1 and 1:3), 24 ml samples were prepared with electrolyte compositions corresponding to three distinct states of charge (SOC) defined by the concentrations of zinc bromide and elemental bromine. In addition to zinc bromide and elemental bromine (which were present in the samples in suitable amounts as set out in Table 5 below in order to match the state of charge investigated), each sample also contained zinc chloride and potassium chloride at constant concentrations of 0.5M and 1.0M, respectively. The samples were stored at 25° C. for 24-48 hours after preparation before any measurement was conducted. The samples were tested for one or more of the following properties: the temperature at which a solid phase is formed in the electrolyte, free bromine concentration in the aqueous phase and conductivity. The results are set out in Table 5.

TABLE 5

| Example | % soc | $ZnBr_2$ (M) | $Br_2$, M | BCA mixture | [BCA] M | Physical state of polybromide complex | % $Br_2$, aq. | Conductivity, mS/cm |
|---|---|---|---|---|---|---|---|---|
| 12A | 0 | 2.25 | 0.2 | 2-MEPy:BMIBr 3:1 | 0.8M | Liquid at 0° C. | 0.18 | 98 |
| 12B | 50 | 1.125 | 1.0 | | | Liquid at 0° C. | 0.20 | 109 |
| 12C | 100 | 0.25 | 2.0 | | | Liquid at 0° C. | 0.14 | 91 |
| 13A | 0 | 2.25 | 0.2 | 2-MEPy:BMIBr 1:1 | 0.8M | Liquid at 0° C. | 0.13 | 101 |
| 13B | 50 | 1.125 | 1.0 | | | Liquid at 0° C. | 0.08 | 109 |
| 13C | 100 | 0.25 | 2.0 | | | Liquid at 0° C. | 0.17 | 91 |
| 14A | 0 | 2.25 | 0.2 | 2-MEPy:BMIBr 1:3 | 0.8M | Liquid at 0° C. | 0.16 | 95 |
| 14B | 50 | 1.125 | 1.0 | | | Liquid at 0° C. | 0.14 | 108 |
| 14C | 100 | 0.25 | 2.0 | | | Liquid at 0° C. | 0.13 | 92 |

Table 5 illustrates that the mixed bromine-containing complex is highly effective, as it did not undergo solidification even at a temperature as low as 0° C., the amount of bromine measured in the aqueous phase is very low and the electrolyte solution exhibits good conductivity.

Examples 15-18 (of the Invention) and 19-20 (Comparative)

An experimental set-up which is schematically illustrated in FIG. 2 was used to evaluate the effect of the presence of various bromine complexing agents on the efficacy of the operation of zinc/bromine membraneless cell. A characteristic property of the cell which was chosen for a quantitative study is the efficiency of zinc plating formed onto the anode surface, when the cell was charged at current density of 40 mA/cm².

During charge, zinc metal is increasingly formed on the anode and elemental bromine is increasingly generated in the electrolyte. In the set of experiments described below, various bromine-complexing agents were added to zinc bromide aqueous electrolyte which was recirculated in a membraneless electrochemical cell configuration during charge, and the bromine-complexing agents were tested for their ability to capture and hold the elemental bromine in the form of water-immiscible phase, minimizing the dissolution of elemental bromine in the aqueous phase of the electrolyte and correspondingly decreasing the direct chemical oxidation of the zinc by elemental bromine present in the aqueous phase. Thus, in membraneless cells, in the absence of physical membrane separating between the zinc and bromine electrodes, the plating efficiency of the zinc critically depends on the efficacy of the bromine-complexing agent.

Experimental Set-Up

Referring to FIG. 2, the experimental set-up comprises a pair of graphite electrodes 21 and 22 which serve as zinc and bromine electrodes, respectively. The electrode plates are made of compressed graphite particles, are rectangular in shape and are about 5 mm thick. The electrodes are mounted horizontally, in parallel with one another, and are spaced 5 mm apart. As shown in FIG. 2, the zinc electrode is placed on top of the bromine electrode. It is noted that no membrane is interposed in the space between the electrodes.

Viton® gaskets 25 are applied onto the sides of the electrodes which face each other, i.e., the lower and upper faces of electrodes 21 and 22, respectively, are covered with the gasket, except for a central region which is left exposed on each of said electrodes faces. The non-coated central regions of the electrodes are hence available for the electrochemical reactions. The electrochemically-reactive central regions on the lower and upper faces of electrodes 21 and 22, respectively, coincide with one another with respect to position, geometric shape and size. Each of the two opposed electrochemically-reactive central regions has the shape of a square with an area of 10 cm².

A flow distributor provided in the form of a Teflon® frame corresponding in shape and size to the rectangular electrodes 21 and 22 is positioned in the space between said electrodes, such that the central open area of the frame coincides with the non-coated active regions of the electrodes with respect to position, geometric shape and size. FIG. 3 provides a top view of the relevant elements, i.e., the electrode plates 21, 22, Viton® gasket 25 and Teflon® flow distributor 26 which were used in the experimental set-up of FIG. 2. The electrode plates are perforated to allow the access and exit of electrolyte flow.

The Compositions of the Tested Solutions

The aqueous electrolyte solutions that were tested contain zinc bromide, elemental bromine and zinc chloride, the latter at a constant concentration of 0.4M. In addition, the following bromine-complexing agents were present in the tested solutions (the BCA's were added at two different concentrations, of 0.8 M and 1.2M):
3:1 mixture of BMIBr and EPy (of the invention)
3:1 mixture of BMIBr and 2-MEPy (of the invention) MEP (comparative).

The electrolyte solutions prepared fall into two groups, A and B, which differ from one another in respect to the concentrations of the zinc bromide and elemental bromine:
Group A: [ZnBr$_2$]=1.64 M, [Br$_2$]=0.2M.
Group B: [ZnBr$_2$]=0.74 M, [Br$_2$]=1.1M.

The composition of solutions of group A corresponds to a state of charge of 0%, i.e., it represents a composition of an electrolyte solution at the beginning of the charging process. The composition of the solutions of group B is representative of a state of charge of 60%. During the experiments, while the electrolysis is in progress, the composition of the solutions gradually varies, with the concentrations of zinc bromide and elemental bromine decreasing and increasing, respectively, such that the final compositions of the solutions of groups A and B match states of charges of 30% and 90%, respectively. Thus, the activity of the bromine-complexing agents was investigated at two distinct "windows" of the cell charge: from 0 to 30% SOC (Group A), and from 60 to 90% SOC (Group B).

The Experiments

All the experiments were carried out at room temperature, with the cell being charged at current density of 40 mA/cm².

Each experiment is run as follows. The electrolyte solution under study is held in a reservoir 23. The electrolyte volume is 90-100 ml (110-130 g). Peristaltic pump 24, operating at 30 rpm which corresponds to a flow rate of around 60 ml per minute, drives the electrolyte solution through the cell, causing the solution to flow in the space between electrodes 21 and 22. The flow path of the electrolyte is schematically indicated by means of arrows in FIG. 2. The electrolyte solution is drawn from the upper (aqueous) part of the electrolyte volume and returned to the bottom of reservoir 23, where the dense (organic) phase accumulates. Each experiment lasted about 4.5 hours. At the end of the experiment, the cell was opened and washed in water and NaHSO$_3$ solution. The anode with Zn deposited thereon was washed several times with deionized water, dried and carefully removed and weighted, to determine the mass of zinc formed through the electrolysis. Plating efficiency was calculated as follows:

$$\text{Plating efficiency} = \frac{M}{\frac{I*t}{F} * \frac{Mw}{z}} * 100$$

M—mass of zinc deposited on the electrode
I—electrical current (0.4 A)
t—time during which the current passed through the cell (16200s)
F—Faraday constant (96485 C/mol)
Mw—molecular weight (g/mol)
—metal valence (2)

The experimental details and the results are tabulated in Table 6.

TABLE 6

| Example | % SOC | ZnBr$_2$ (M) | Br$_2$ (M) | BCA Additive | [BCA additive] M | Plating efficiency % |
|---|---|---|---|---|---|---|
| 15A | 0-30 | 1.64-1.19 | 0.2-0.65 | BMIBr:EPy 3:1 | 0.8M | 48% |
| 15B | 60-90 | 0.74-0.29 | 1.1-1.55 | | | 37% |
| 16A | 0-30 | 1.64-1.19 | 0.2-0.65 | | 1.2M | 91-93% |
| 16B | 60-90 | 0.74-0.29 | 1.1-1.55 | | | 88-90% |
| 17A | 0-30 | 1.64-1.19 | 0.2-0.65 | BMIBr:2-MEPy 3:1 | 0.8 | 68-70% |
| 17B | 60-90 | 0.74-0.29 | 1.1-1.55 | | | 65% |
| 18A | 0-30 | 1.64-1.19 | 0.2-0.65 | | 1.2 | 94% |
| 18B | 60-90 | 0.74-0.29 | 1.1-1.55 | | | 90% |
| 19A | 0-30 | 1.64-1.19 | 0.2-0.65 | MEP | 0.8 | <20% |
| 19B | 60-90 | 0.74-0.29 | 1.1-1.55 | | | <20% |
| 20A | 0-30 | 1.64-1.19 | 0.2-0.65 | | 1.2 | <20% |
| 20B | 60-90 | 0.74-0.29 | 1.1-1.55 | | | <20% |

The results in Table 6 show that the lower the free bromine concentration in the aqueous phase is (see Tables 3, 4 and 5 for relevant data), the lesser the direct reaction between bromine in the electrolyte and the plated Zn (self-discharge). As a result, the plating efficiency is higher for electrolyte with more bromine complexed in the oily phase.

The invention claimed is:

1. An energy storage device comprising at least one electrochemical cell and an electrolyte recirculation system, wherein the at least one electrochemical cell contains spaced apart zinc and bromine electrodes, mounted in parallel with one another, wherein the space between the electrodes is devoid of a membrane or separator, where the energy storage device further comprises a recirculating electrolyte suitable for use in a zinc bromine membraneless flow cell, said electrolyte comprising aqueous zinc bromide solution and a liquid complex composed of bromine-complexing agent combined with one or more bromine molecules, wherein the bromine-complexing agent is selected from the group consisting of:
   (i) N-alkyl pyridinium halide;
   (ii) N-alkyl-2-alkyl pyridinium halide;
   (iii) 1-alkyl-3-alkyl imidazolium halide;
   and mixtures thereof, wherein the alkyl groups in each of compounds (ii) and (iii) may be the same or different.

2. An energy storage device according to claim 1, wherein the bromine-complexing agent is selected from the group consisting of:
   (i) N-ethyl pyridinium bromide;
   (ii) N-ethyl-2-methyl pyridinium bromide;
   (iii) 1-butyl-3-methyl imidazolium bromide;
   and mixtures thereof.

3. An energy storage device according to claim 1, wherein the electrolyte comprises a mixture of 1-alkyl-3-alkyl imidazolium halide and at least one of N-alkyl pyridinium halide and N-alkyl-2-alkyl pyridinium halide.

4. An energy storage device according to claim 3, wherein the electrolyte comprises a mixture of 1-alkyl-3-methyl imidazolium bromide and at least one of N-alkyl pyridinium bromide and N-alkyl-2-methyl pyridinium bromide.

5. An energy storage device according to claim 4, wherein the electrolyte comprises a mixture of 1-butyl-3-methyl imidazolium bromide and at least one of N- ethyl pyridinium bromide and N-ethyl-2-methyl pyridinium bromide.

6. A process of operating a zinc bromine membraneless flow cell, comprising adding to an electrolyte of said cell at least one bromine-complexing agent selected from the group consisting of:
   (i) N-alkyl pyridinium halide;
   (ii) N-alkyl-2-alkyl pyridinium halide; and
   (iii) 1-alkyl-3-alkyl imidazolium halide,
   wherein the alkyl groups in each of compounds (ii) and (iii) may be the same or different; and charging and/or discharging said cell.

7. A process according to claim 6, wherein the at least one bromine compelxing agent is selected from the group consisting of:
   (i) N-ethyl pyridinium bromide;
   (ii) N-ethyl-2-methyl pyridinium bromide; and
   (iii) 1-butyl 3-methyl imidazolium bromide.

8. A process according to claim 6, wherein a mixture of bromine complexing agents is added to the cell, said mixture comprising 1-alkyl-3-alkyl imidazolium halide and at least one of N-alkyl pyridinium halide and N-alkyl-2-alkyl pyridinium halide.

9. A process according to claim 8, wherein the mixture comprises 1-alkyl-3-methyl imidazolium bromide and at least one of N-alkyl pyridinium bromide and N-alkyl-2-methyl pyridinium bromide.

10. A process according to claim 9, wherein the mixture comprises 1-butyl 3-methyl imidazolium bromide and at least one of N-ethyl pyridinium bromide and N-ethyl-2-methyl pyridinium bromide.

* * * * *